No. 850,041. PATENTED APR. 9, 1907.
T. McNEAL.
CALCINING FURNACE.
APPLICATION FILED DEC. 19, 1906.
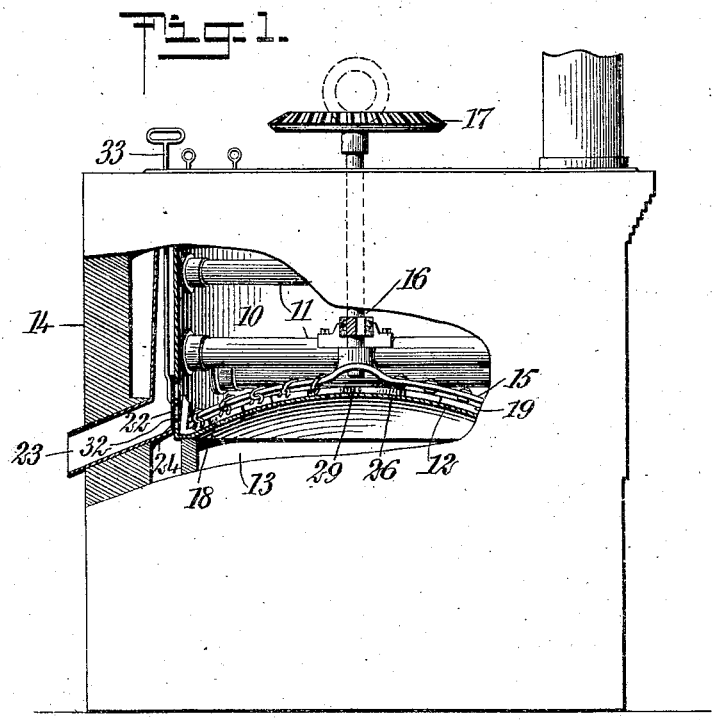
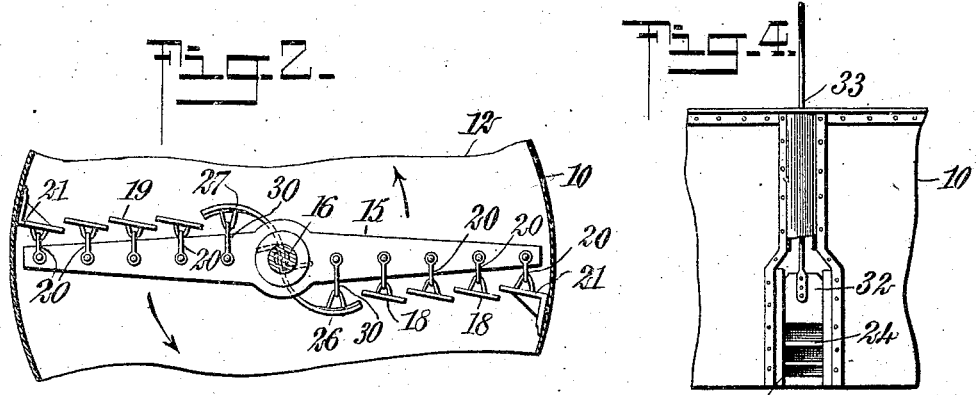
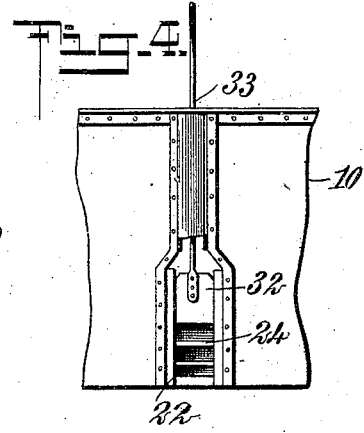
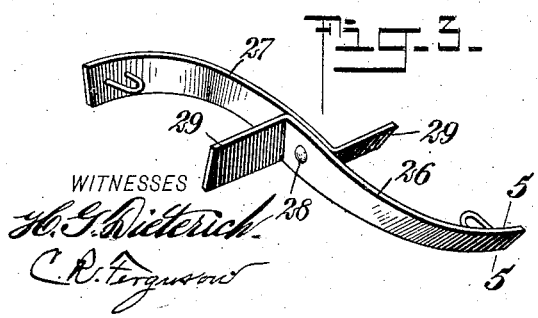
WITNESSES
INVENTOR
Thomas McNeal
BY
ATTORNEYS

UNITED STATES PATENT OFFICE.

THOMAS McNEAL, OF KANSAS CITY, MISSOURI.

CALCINING-FURNACE.

No. 850,041.          Specification of Letters Patent.          Patented April 9, 1907.

Application filed December 19, 1906. Serial No. 348,524.

*To all whom it may concern:*

Be it known that I, THOMAS McNEAL, a citizen of the United States, and a resident of Kansas City, in the county of Jackson and State of Missouri, have invented a new and Improved Calcining-Furnace, of which the following is a full, clear, and exact description.

This invention relates particularly to improvements in scrapers or agitators used in apparatus for calcining plaster and like material, an object being to so construct the scraper that it will engage closely with all parts of the convex bottom of the calcining vessel, thus thoroughly stirring the material in the vessel. Other objects of the invention will appear in the general description.

I will describe a calcining-furnace embodying my invention and then point out the novel features in the appended claims.

Reference is to be had to the accompanying drawings, forming a part of this specification, in which similar characters of reference indicate corresponding parts in all the figures.

Figure 1 is an elevation, partly in section, of a calcining-furnace embodying my invention. Fig. 2 shows the scraper in plan. Fig. 3 is a perspective view of a portion of the scraper. Fig. 4 is a detail showing the outlet and controlling door therefor, and Fig. 5 is a section on the line 5 5 of Fig. 3.

The general construction of the furnace is similar to that shown in the patent granted to me under date of February 16, 1897, No. 577,059.

Referring to the drawings, 10 designates a calcining vessel having cross-flues 11 for the passage of products of combustion, and the vessel is provided with a convex bottom 12, the object in convexing the bottom being to provide a comparatively large area of heating-surface, and the vessel is arranged over a heating-chamber 13, the said heating-chamber and the vessel being placed in a casing 14, of brick or other suitable material.

The scraper or agitator comprises a bar 15, which is longitudinally curved or corresponding practically to the curvature of the bottom 12, this bar being attached to a driving-shaft 16, extended upward and provided with a gear-wheel 17, operated from any suitable source. The bar 15, it will be noted, is extended in opposite directions from the shaft 16, and on one extension is a plurality of scrapers 18, while on the other extension is a plurality of scrapers 19, the scrapers 19 being arranged on the opposite side of the bar from the scrapers 18, and the several scrapers are connected to the bar by links 20. At the outer ends of the bar are scrapers 21, which have portions for engaging upon the bottom of the calcining vessel and also horizontally-disposed portions for engaging against the wall of the vessel. The object of the horizontally-disposed portions of these outer scrapers is to permit their passing over the outlet 22 from the calcining vessel and communicating with a spout 23. The outlet is provided with a plurality of transverse bars 24, which form guides for the horizontally-disposed portions of said end scrapers. These end scrapers are also connected to the bar by means of links 20.

The main feature of my present invention resides in the central scraper, which as a whole is practically S-shaped; but it consists of two oppositely-curved sections 26 27, pivotally connected together, as indicated at 28, and at the inner ends the sections have outwardly-extended portions 29, practically at right angles to the body portion. The outer ends of the sections 26 and 27 are connected to the bar 15 by links 30. By making this central scraper of two pivotally-connected sections and by providing the projections 29 the said central scraper will bear closely upon the convex bottom of the calcining vessel, and, as indicated in Fig. 5, the lower edges 31 of the sections in the extensions 29 are beveled, so as to provide sharp cutting edges, which engage with said bottom of the calcining vessel.

The outlet from the vessel is normally closed by a sliding gate or valve 32, from which a hand-rod 33 extends upward.

In operation the several scrapers will engage by gravity upon the convex bottom of the calcining vessel and obviously will follow the contour or curve thereof.

Having thus described my invention, I claim as new and desire to secure by Letters Patent—

1. The combination with a furnace, of a calcining vessel arranged therein and having a convex bottom, a shaft extended vertically in said vessel, a bar attached to the lower end of said shaft, a plurality of scrapers having link connection with the bar, and a central scraper consisting of two sections curved in opposite directions and pivotally connected together, said central scraper being carried by said bar.

2. In a calcining device, a furnace, a calcining vessel arranged therein and having a convex bottom, a vertically-extended shaft in the vessel, a bar carried by said shaft, a plurality of scrapers carried by the bar, and a central scraper consisting of two pivotally-connected sections curved in opposite directions, the inner or pivotal ends of said sections being extended outward at substantially right angles to the sections.

3. In a calcining device, a furnace, a calcining vessel arranged therein, a vertical shaft in the vessel, a bar carried by said shaft, a plurality of scrapers having swinging connection with the bar, a central scraper consisting of two pivotally-connected sections, the inner or pivotal ends thereof having outward extensions, and link connections between the outer ends of said sections and said bar.

4. In a calcining device, a furnace, a calcining vessel arranged therein and having a convex bottom, a shaft arranged vertically in the vessel, a bar carried by the shaft and conforming to the curvature of the bottom of the vessel, a plurality of scrapers carried by said bar, a central scraper consisting of two pivotally-connected sections curved in opposite directions and having outward projections at their inner ends, the lower edges of said sections being inclined to form cutting edges, and link connections between the outer ends of the sections and the bar.

In testimony whereof I have signed my name to this specification in the presence of two subscribing witnesses.

THOMAS McNEAL.

Witnesses:
N. L. JONES,
L. SIMPSON.